United States Patent
Moguillansky

(10) Patent No.: US 9,693,207 B2
(45) Date of Patent: Jun. 27, 2017

(54) UNIFIED NOTIFICATION AND RESPONSE SYSTEM

(71) Applicant: Sony Corporation, Tokyo (JP)

(72) Inventor: Jeff Moguillansky, San Diego, CA (US)

(73) Assignee: Sony Corporation, Tokyo (JP)

( * ) Notice: Subject to any disclaimer, the term of this patent is extended or adjusted under 35 U.S.C. 154(b) by 192 days.

(21) Appl. No.: 14/632,453

(22) Filed: Feb. 26, 2015

(65) Prior Publication Data

US 2016/0255480 A1 Sep. 1, 2016

(51) Int. Cl.
*H04W 4/14* (2009.01)
*H04L 12/761* (2013.01)
*H04L 29/08* (2006.01)
*G10L 21/10* (2013.01)

(52) U.S. Cl.
CPC .............. *H04W 4/14* (2013.01); *H04L 45/16* (2013.01); *H04L 67/02* (2013.01); *H04L 67/306* (2013.01)

(58) Field of Classification Search
CPC ....... H04L 45/16; H04L 67/02; H04L 67/306; H04W 4/14
USPC ........................................ 709/223, 206, 207
See application file for complete search history.

(56) References Cited

U.S. PATENT DOCUMENTS

| | | | | |
|---|---|---|---|---|
| 6,161,134 A * | 12/2000 | Wang | ................... | G06F 1/1632 709/220 |
| 8,375,411 B2 | 2/2013 | Axelsson et al. | | |
| 2002/0067714 A1 * | 6/2002 | Crain | .................. | H04Q 3/0045 370/352 |
| 2002/0069223 A1 * | 6/2002 | Goodisman | ....... | G06F 17/30867 715/201 |
| 2002/0181694 A1 * | 12/2002 | Mani | ................. | H04L 29/06027 379/373.02 |
| 2003/0014754 A1 * | 1/2003 | Chang | .................... | G06Q 30/02 725/60 |
| 2005/0197767 A1 * | 9/2005 | Nortrup | ............. | G01C 21/3667 701/420 |
| 2007/0032225 A1 * | 2/2007 | Konicek | ........... | H04M 1/72513 455/417 |
| 2007/0222901 A1 * | 9/2007 | Tsubota | ................. | G08C 23/04 348/734 |

(Continued)

FOREIGN PATENT DOCUMENTS

| | | |
|---|---|---|
| TW | M447641 U | 2/2013 |
| WO | 2007040520 | 4/2007 |

OTHER PUBLICATIONS

"Push Notifications to Mobile Devices Using Amazon SNS". Amazon Web Services Blog, Aug. 13, 2013. http://aws.amazon.com/blogs/aws/push-notifications-to-mobile-devices-using-amazon-sns/.

*Primary Examiner* — Alina N Boutah
(74) *Attorney, Agent, or Firm* — John L. Rogitz

(57) ABSTRACT

A unified notification system in which notifications for all of a user's devices and services appear in windows of all of the user's devices. Notifications related to the user's social network friends and public users that the user subscribes to may also appear in the windows of all devices. Events from the user's devices and accounts are sent to a server for aggregation and provisioning back to the user's devices. To this end, a HTTP API may query the server to receive the user's notifications. Notifications that include content can also include metadata. The user can respond to any notification from any device.

18 Claims, 5 Drawing Sheets

(56) References Cited

U.S. PATENT DOCUMENTS

| | | | |
|---|---|---|---|
| 2008/0068127 A1* | 3/2008 | Lin | G05B 19/0421 340/3.7 |
| 2008/0140398 A1* | 6/2008 | Shpigel | G10L 15/26 704/235 |
| 2009/0292817 A1* | 11/2009 | Cho | H04L 12/2818 709/230 |
| 2010/0075631 A1* | 3/2010 | Black | H04M 1/05 455/410 |
| 2010/0150001 A1* | 6/2010 | Tsuchiya | H04M 1/72519 370/252 |
| 2010/0165887 A1* | 7/2010 | Ristock | H04L 12/1818 370/260 |
| 2010/0322395 A1* | 12/2010 | Michaelis | G06Q 10/107 379/88.14 |
| 2011/0013756 A1* | 1/2011 | Davies | G10L 15/22 379/88.14 |
| 2011/0034203 A1 | 2/2011 | Holm et al. | |
| 2012/0003989 A1* | 1/2012 | Gravino | H04M 3/42357 455/456.1 |
| 2012/0166538 A1* | 6/2012 | Son | H04L 67/02 709/204 |
| 2012/0173610 A1 | 7/2012 | Bleau et al. | |
| 2012/0185922 A1* | 7/2012 | Kamity | H04N 21/25875 726/4 |
| 2012/0221962 A1 | 8/2012 | Lew et al. | |
| 2012/0239762 A1* | 9/2012 | Fisher | H04N 21/4108 709/206 |
| 2013/0079931 A1* | 3/2013 | Wanchoo | G01D 4/002 700/278 |
| 2013/0108032 A1* | 5/2013 | Shaw | H04W 4/16 379/88.14 |
| 2013/0121239 A1* | 5/2013 | Hicks, III | H04W 4/12 370/328 |
| 2013/0293363 A1* | 11/2013 | Plymouth | G06Q 20/42 340/309.16 |
| 2014/0156281 A1* | 6/2014 | Boyd | H04L 12/281 704/275 |
| 2014/0306838 A1* | 10/2014 | Beumler | B60N 2/28 340/988 |
| 2014/0358521 A1* | 12/2014 | Mikutel | G06Q 10/107 704/9 |
| 2015/0026477 A1* | 1/2015 | Malatack | G06F 9/541 713/176 |
| 2015/0066516 A1* | 3/2015 | Nishikawa | F24C 7/08 704/275 |
| 2015/0097958 A1* | 4/2015 | Fadell | F24F 11/0009 348/152 |
| 2015/0204561 A1* | 7/2015 | Sadwick | F24F 11/006 236/1 C |
| 2015/0373056 A1* | 12/2015 | Bouthemy | H04L 65/1006 709/203 |
| 2016/0132975 A1* | 5/2016 | Liao | G06Q 30/0202 705/7.31 |
| 2016/0148099 A1* | 5/2016 | Micali | G06N 5/04 706/11 |
| 2016/0198319 A1* | 7/2016 | Huang | H04L 67/26 455/412.2 |
| 2016/0205123 A1* | 7/2016 | Almurayh | H04L 63/1425 726/23 |

\* cited by examiner

UNIFIED NOTIFICATION AND RESPONSE SYSTEM

FIELD OF THE INVENTION

The application relates generally to unified notification and response systems.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

SUMMARY OF THE INVENTION

An example ecosystem that is pertinent here is one which facilitates unified notifications and responses across a spectrum of devices employed by the same user. As understood herein, a problem arises when different notifications appear on each of the user's devices, and the user must use a specific device to see the notifications for that device. Not only is this inconvenient, it increases latency to receive and respond to notifications.

Accordingly, a computer device includes at least one computer readable storage medium having instructions executable by a processor and at least one processor configured for accessing the computer readable storage medium to execute the instructions to configure the processor for receiving from a server via a network a notification from an apparatus correlated by the server to be associated with the computer device, and presenting the notification on a display not controlled by the apparatus generating the alert.

In examples, the instructions when executed by the processor may configure the processor for receiving notifications from plural apparatuses correlated by the server to be associated with the computer device, and presenting the notifications on the display. If desired, the instructions when executed by the processor can configure the processor for presenting on the display notifications of friends of a user of the computer device.

In some implementations the instructions when executed by the processor configure the processor for presenting on the display notifications of public users that the user subscribes to. The instructions when executed by the processor can also configure the processor for sending to the server signals representing notifications received by the computer device, for provisioning of the notifications to apparatuses correlated by the server to the computer device. Moreover, example instructions when executed by the processor configure the processor for executing a hypertext transfer protocol (HTTP) application programming interface (API) to query the server to receive notifications from apparatuses correlated by the server to the computer device. The notification may include content and metadata about the content. In certain examples the instructions when executed by the processor configure the processor for presenting on the display at least one selector element selectable to send a signal to the apparatus to respond to the notification from the apparatus.

In another aspect, a system includes a non-transitory computer memory with instructions executable by at least one wireless communication device (WCD) associated with a user to configure the WCD to receive a test message from an originator device, send the text message to at least one computerized appliance associated with the user, with the computerized appliance not being the originator device, receive from the appliance a response to the text message, and send the response received from the appliance to the originator device.

In another aspect, a system includes, a non-transitory computer memory with instructions executable by at least one wireless communication device (WCD) associated with a user to configure the WCD to record a voice message from a calling device, send the voice message to a server for transcribing the voice message into an alpha-numeric transcription thereof for presentation of the transcription to an appliance associated at the server with the WCD, and receive voice data signals from the appliance and send the voice data signals to the originating device.

The details of the present invention, both as to its structure and operation, can be best understood in reference to the accompanying drawings, in which like reference numerals refer to like parts, and in which:

DETAILED DESCRIPTION

Figure 1:
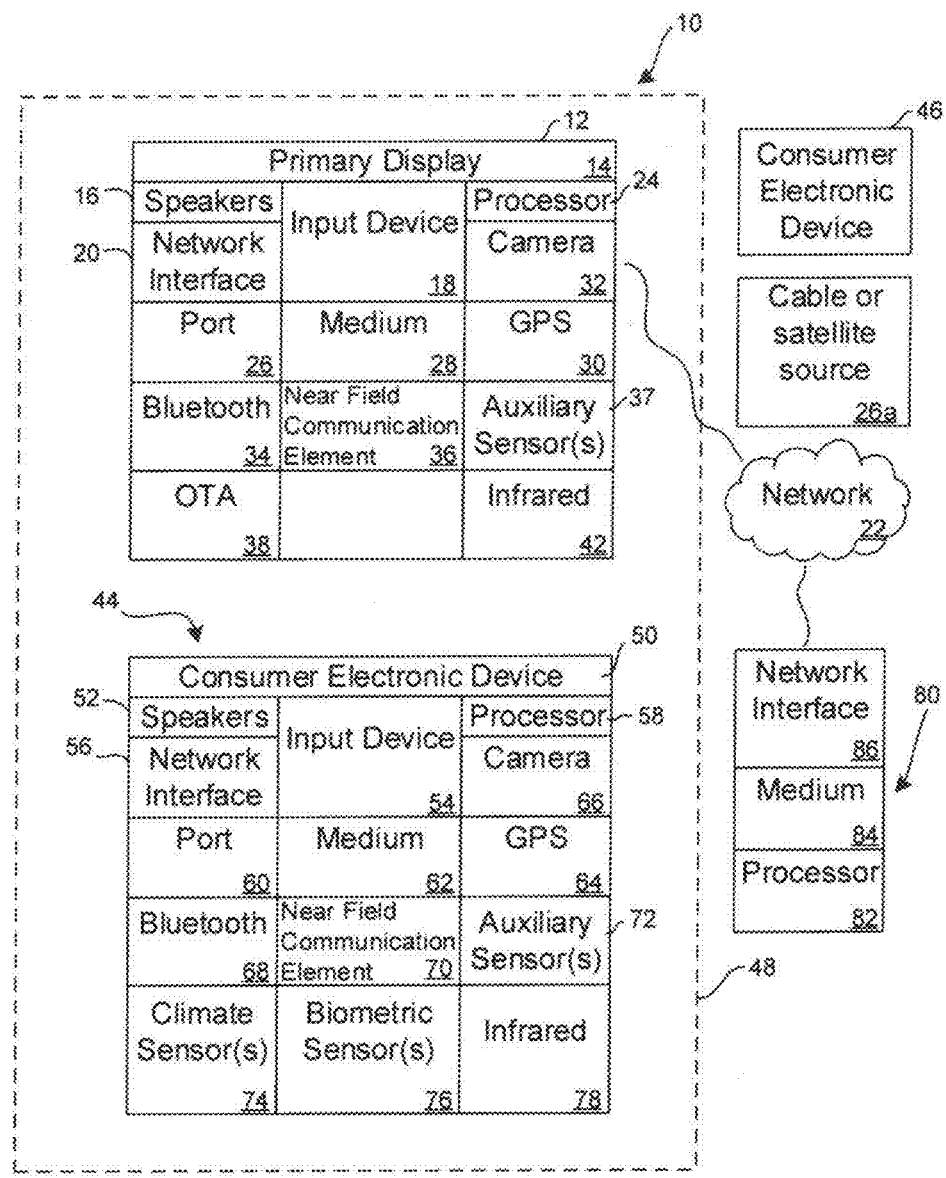
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft, or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the internet, an WAN, an LAN, etc. under control or one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more tangible computer readable storage medium 28 such as disk-based or solid state storage, in some cases embodied in the chassis of the AVDD as standalone devices or as a personal video recording device (PVR) or video disk player either internal or external to the chassis of the AVDD for playing back AV programs. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input, to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AY play and pause commands to the AVDD 12, or it may be a more sophisticated device such as a tablet computer, a wireless telephone, etc.

Accordingly, the first CE device 44 may include one or more displays 50 that may be touch-enabled for receiving user input signals via touches on the display. The first CE device 44 may include one or mote speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more barometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium. 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
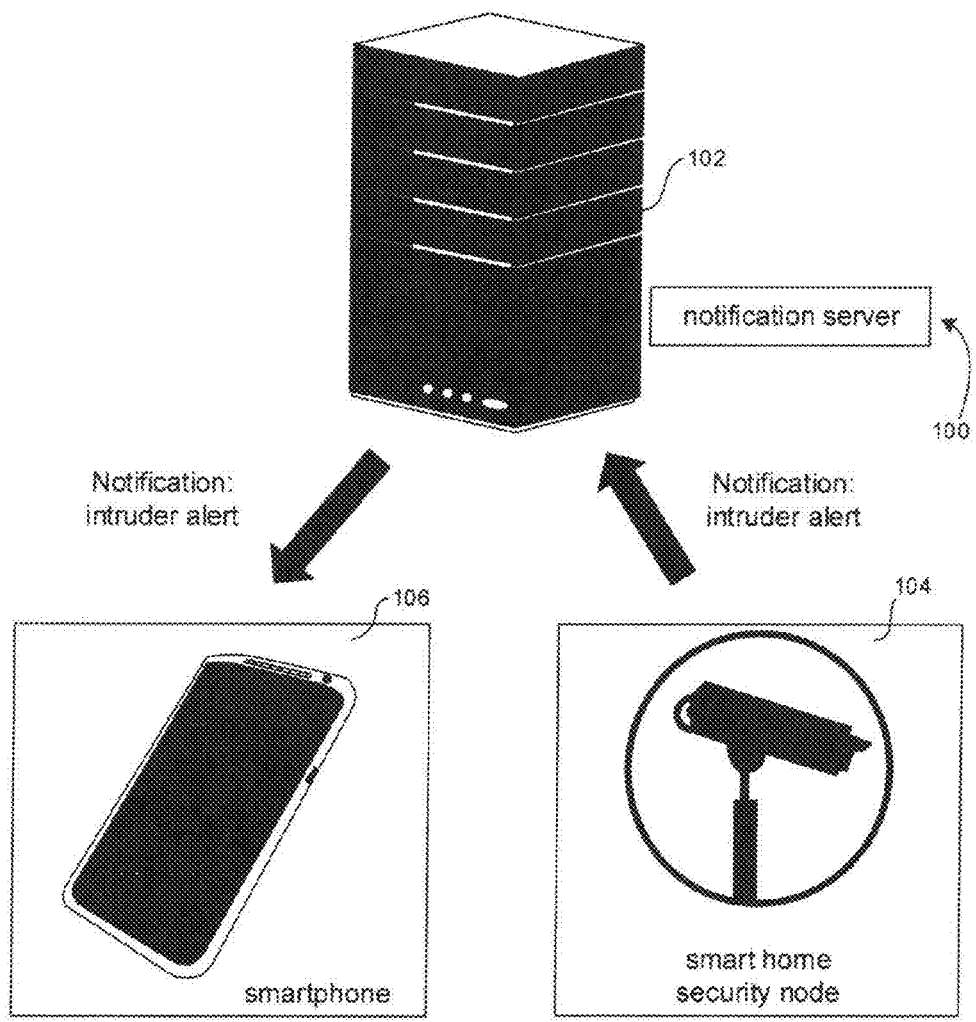
FIG. 2 is a schematic diagram showing components of an example user device group.

FIG. 2 shows a simplified unified notification system 100 that includes a cloud server 102 (which may be implemented by the server 80 shown in FIG. 1) receiving notifications such as intruder alerts as sensed by a smart, home security node 104 (which may be implemented by the second CE device 46 shown in FIG. 1). For example, the node 104 may employ image recognition to captured surveillance video and match the recognized images to templates indicating intruders are about, generating the alert accordingly. In addition or alternatively the node 104 may include motion sensors that are not cameras such as infrared detectors to detect warm moving objects and generate the intruder alert in response thereto. The server 102 than sends the notification to a user's consumer electronics (CE) device 106 such as a smart phone (which may be implemented by the first CE device 44 shown in FIG. 1). The CE device 106 is registered with the server as being associated with the node 104 so that the server 102 knows the correct network address to which to send alerts form the node 104.

Figure 3:
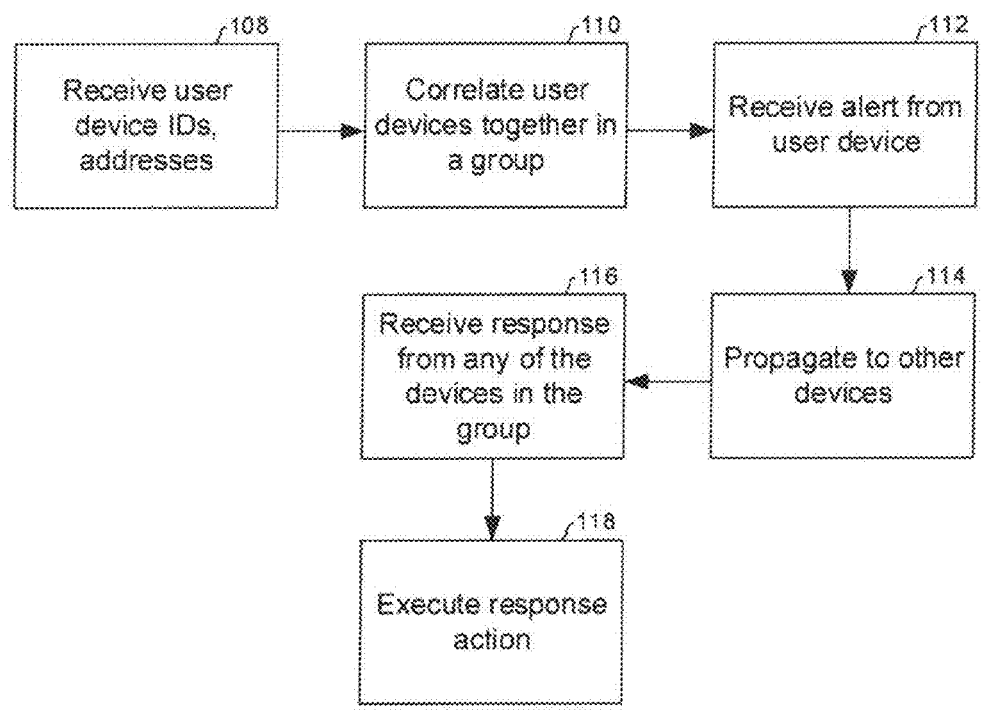
FIG. 3 is a flow chart of example logic according to present principles.

Now referring to FIG. 3, commencing at block 108 the server 102 receives the identifications and/or network addresses of devices of a user that the user wishes to correlate together as a group for unified notification purposes at block 110. This may be accomplished by the user accessing the server 102 using the CE device 106 and inputting, via a user interface (UI) provided by the server, the various network addresses of the various devices the user wants to register as a notification group. Or, at point of sale of each device the user purchases, the address/ID of the newly purchased device along with the user's name may be uploaded to the server 102, which automatically groups all devices associated with the same user name together. These are but two non-limiting examples of how to execute the logic at blocks 108 and 110.

In addition to grouping the devices of a user and correlating them at block 110, the devices of friends of the user may be included in the group, so that the user receives notifications from those devices as well on all of the user's devices. Furthermore, notifications of public users that the user subscribes to may be sent to the server 102 for provisioning thereof to all of the user's devices.

Proceeding to block 112, an alert is received by the server from a device in a group correlated together at block 110. At block 114 this alert is sent from the server to all devices in the group correlated together at block 110 with the possible exception of the device originating the alert, since that device is already aware of the alert.

Moving to block 116, the server receives, from any device or devices receiving the alert, a response, and executes the response action at block 118. For example, the response action may be to send a notification to public safety personnel of an event and the physical address (which can be part of the original alert at block 112) to which the alert pertains. Or, the response action may be to send a command to local alarm to activate. These are but two non-limiting examples of response actions that may be undertaken at block 118.

Figure 4:
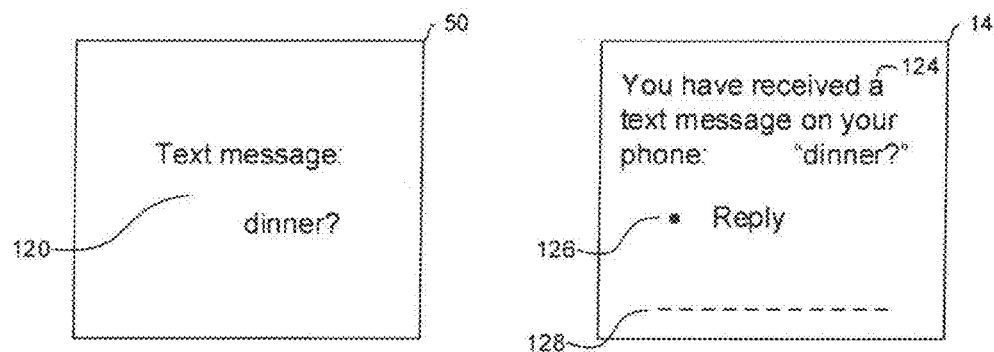
FIGS. 4-7 are screen shots of example user interfaces (UIs) according to present principles.

The alerts and responses need not be of an emergency nature. FIG. 4 illustrates related screen shots in which a user has received, on the display 50 of the first CE device 44, a text message 120. The example test message is a query for dinner. This alert from a device not necessarily in the user's device group is received by the server and provided not only to the first CE device 44 but also to the AVDD 12 for presentation 124 thereof on its display 14 as shown. In this example, not only is the alert shown on the display 14, but also the identification of the user's device to which the alert was originally addressed, in this case, the user's cell phone. The user may select a reply selector 126 on the AVDD 12 to input a reply to the alert in fields 128. The reply may be sent to the server, which can either transmit the reply to the originator of the alert (text) or which can send the reply to the device originally receiving the alert (in this case, the first CE device 44), which may then automatically or upon user authorization relay the reply to the originator of the alert.

Thus, in the example use case of FIG. 4, a user's cell phone receives SMS text message on the cell phone, while user is watching the AVDD. The notification appears on all of user's devices, including the AVDD, that the user received a text message, along with the contents of the text message, and other metadata. The user can see a notification window pop up on the AVDD as shown so that the user is instantly notified that a text message was received on the cell phone. In addition, the user is able to respond to the text message using the user interface on the AVDD, which can then be sent to the server, sent back to the phone, and then finally sent from the phone as an SMS text message to the originating device of the alert.

Figure 5:
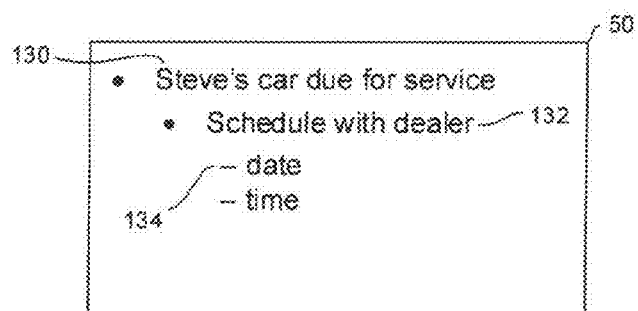

FIG. 5 illustrates another example use case. In FIG. 5, a UI 130 has been presented on the display 50 of the first CE device 44. In this example, the vehicle of a person ("Steve")

associated with the user, such as the user's child, requires service. The user may have included in the device group registered with the server 102 a device of the person "Steve", such as the vehicle of the person in which the vehicle's engine control module (ECM) can wirelessly send to the server 102 an automatically-generated service notification. Or, a computer associated with a vehicle service facility that tracks service schedules of various vehicles may be included in the user's group and may be programmed to send notifications to the server 102 which appertain to user-designated vehicle IDs, such as the vehicle of the associated person "Steve".

Figure 6:
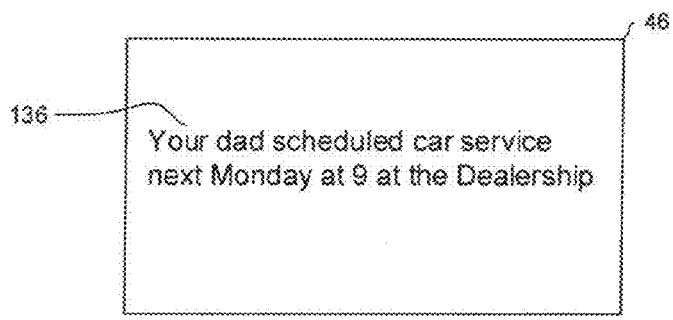

The UI 130 as shown may include a description of the necessary maintenance, along with a recommended solution 132, in this case, a selector selectable to schedule a service appointment. This alert may be responded by scheduling an appointment for service by inputting date and time into a date and time field 134. As shown in FIG. 6, and assuming momentarily that the associated person "Steve" employs the second CE device 46 for illustration, a notification 136 of the appointment may be automatically sent via the server 102 to the person "Steve" CE device 46.

Figure 7:
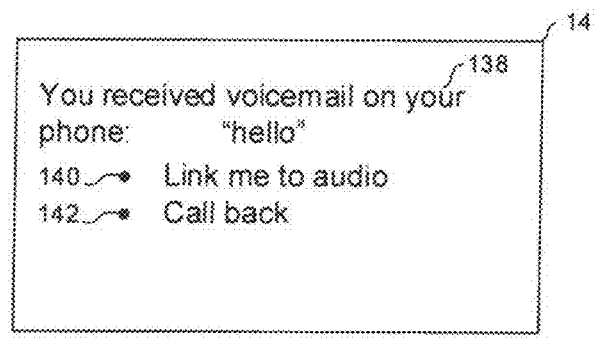

FIG. 7 illustrates yet another example use case in which a user has received, on the first CE device 44 implemented as a cell phone, a voice mail. The CE device 44 uploads a notification of this to the server 102, which propagates the notification to all devices in the group as described above, including the AVDD 12. The notification 138 may be duly presented on the display 14, along with, e.g., an alphanumeric transcript of the notification as generated by the server 102 using voice recognition software processing the recorded message. The UI shown in FIG. 7 may include a selector 140 to link the AVDD 12 to the recorded audio on the voice mail of the CE device 44, which may be provided to the server 102 by the CE device 44. Selecting the selector 140 may cause the server to download the audio recording to the AVDD 12 for play thereof by the AVDD 12.

Also, a selector 142 may be provided which can be selected to cause the CE device 44 to call back the originator device of the voice message. The user respond to the voicemail by calling the original caller, using a microphone on the AVDD or on a remote commander of the AVDD. The microphone captures the audio and the capturing device (e.g., the EC) sends the response audio to the server 102 in near real-time. The server 102 in turn sends the audio to the user's CE device 44 (implemented in this example as a cell phone), and the user's phone automatically in response to the audio from the server calls back the original caller, sending the user's response audio thereto. When the cell phone receives back audio, it sends it to the server which sends if back to the AVDD for play thereof through the speakers of the AVDD.

Accordingly, it may now be appreciated that present principles provide a unified notification system in which notifications for all of the user's devices and services will appear in the notifications window of all of the users devices. In addition, notifications of the user's friends, and notifications of public users that the user subscribes to may appear in the notifications window. All events from all of the user's devices and accounts can be sent to a server in the cloud, and then a server application will process the events and generate notifications for the user. A generalized HTTP API can be available to query the server to receive the user's notifications. All media content can be processed to metadata, so that all notifications that include content may also include metadata. In addition, notifications may be processed by the server to generate real-time ratings and statistics of content. Finally, the user can respond to any notification from any device.

Thus, present principles extend the notion of notifications to include notifications for all of the user's devices and services, as well as notifications for devices and services of other users that the user is subscribed to, including the user's friends and public users.

As well, real-time ratings and statistics may be generated. For example, when a user tunes to a TV channel, the TV can send an event to the server, which may then use the event to generate real-time ratings and send appropriate notifications to the user, including most-popular programs, etc. In examples, a standardized hypertext transfer protocol application programming interface (HTTP API) may be used for sending events including data from any device or service to a cloud-based server, and for reading notifications from the cloud-based server.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. System comprising:
    at least one server;
    at least one non-transitory computer memory with instructions executable by at least one wireless communication device (WCD) associated with a user to configure the WCD to:
    receive a voice message from an originator device;
    send a signal representing the voice message to the server;
    at least one computerized appliance that is not the server, the originator device, or the WCD;
    the server being programmed with instructions to propagate signals representing the voice message to the at least one computerized appliance for presentation of a message on the computerized appliance along with an audio and/or textual representation of the voice message;
    the computerized appliance being programmed with instructions to present on at least one user interface (UI) including at least a first selector selectable to link the computerized appliance to an audio of the voice message and at least a second selector selectable to cause the computerized appliance to send audio for a call back to the originator device of the voice message.

2. The system of claim 1, wherein the computerized appliance is programmed to accesses instructions for receiving notifications from plural apparatuses correlated by the server to be associated with the computerized appliance, and presenting the notifications on a display of the computerized appliance.

3. The system of claim 1, wherein the computerized appliance is programmed to accesses instructions for presenting on a display notifications of friends of a user of the computer appliance.

4. The system of claim 1, wherein the computerized appliance is programmed to accesses instructions for presenting on a display notifications of public users that the user subscribes to.

5. The system of claim 1, wherein the computerized appliance is programmed to accesses instructions for sending to the server signals representing notifications received by the computerized appliance, for provisioning of the notifications to apparatuses correlated by the server to the computerized appliance.

6. The system of claim 1, wherein the computerized appliance is programmed to accesses instructions for executing a hypertext transfer protocol (HTTP) application programming interface (API) to query the server to receive notifications from apparatuses correlated by the server to the computerized appliance.

7. The system of claim 6, wherein the notification includes content and metadata about the content.

8. System comprising:
   at least one non-transitory computer memory with instructions executable by at least one wireless communication device (WCD) associated with a user to configure the WCD to:
   record a voice message from a calling device;
   send the voice message to a server for transcribing the voice message into an alpha-numeric transcription thereof for presentation of the transcription to an appliance associated at the server with the WCD, the appliance being separate from the WCD; and
   receive voice data signals from the appliance and send the voice data signals to the originating device.

9. The system of claim 8, wherein the instructions configure the WCD to communicate with a server to receive the voice data signals from the appliance.

10. The system of claim 8, comprising the appliance, the appliance being configured with instructions to configure the appliance to present on a display associated with the appliance a notification of the voice message.

11. The system of claim 10, the appliance being configured with instructions to configure the appliance to present on the display a link to a data encoding of the voice message, the link being selectable to cause the appliance to play the voice message on at least one speaker associated with the appliance.

12. The system of claim 10, the appliance being configured with instructions to configure the appliance to receive from a microphone a voice response, the appliance being configured with instructions to configure the appliance to send the voice response to the server for provisioning of the voice response to the WCD.

13. The system of claim 10, further comprising the server.

14. A system, comprising:
   at least one server configured to receive at least one message from an originator device addressed to a recipient device;
   the server comprising at least one processor accessing instructions executable by the processor for:
   accessing a data structure associating an identity of the user with at least one computerized appliance associated with a user of the recipient device, the computerized appliance not being the originator device, the server, or the recipient device;
   sending the message to the computerized appliance along with an identification of the recipient device as being the recipient of the message;
   receiving from the computerized appliance a response; and
   executing an action responsive to the response.

15. The system of claim 14, wherein the action includes sending a notification based on the message to public safety personnel of an event and a physical address to which the message pertains.

16. The system of claim 14, wherein the action includes sending a command to an alarm to activate.

17. The system of claim 14, wherein the computerized appliance is a device associated with a friend of the user.

18. The system of claim 14, wherein the instructions are executable to send the message to all of plural devices.

* * * * *